United States Patent
Posselt et al.

(10) Patent No.: US 6,912,840 B2
(45) Date of Patent: Jul. 5, 2005

(54) DIAGNOSIS OF A WATER ADSORBER IN THE EXHAUST OF AN INTERNAL COMBUSTION ENGINE

(75) Inventors: Andreas Posselt, Muehlacker (DE); Wolfgang Boerkel, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/364,221

(22) Filed: Feb. 11, 2003

(65) Prior Publication Data

US 2003/0177760 A1 Sep. 25, 2003

(30) Foreign Application Priority Data

Feb. 14, 2002 (DE) .......................... 102 05 968

(51) Int. Cl.$^7$ .................................. F01N 3/00
(52) U.S. Cl. .................. 60/274; 60/277; 60/289; 60/292; 60/299
(58) Field of Search .......... 60/274, 277, 289, 60/292, 293, 299, 320

(56) References Cited

U.S. PATENT DOCUMENTS

| | | | |
|---|---|---|---|
| 4,835,964 A | * | 6/1989 | Kume et al. .................. 60/285 |
| 5,590,521 A | | 1/1997 | Schnaibel et al. |
| 5,678,403 A | * | 10/1997 | Kanehara et al. ............. 60/309 |
| 5,939,028 A | * | 8/1999 | Bennett et al. ............. 422/177 |
| 6,477,831 B1 | * | 11/2002 | Ballinger et al. ............. 60/284 |
| 6,581,370 B2 | * | 6/2003 | Sato et al. .................... 60/277 |

FOREIGN PATENT DOCUMENTS

| | | |
|---|---|---|
| DE | 43 38 342 | 5/1995 |
| WO | WO 96/39576 | 12/1996 |
| WO | WO 99/34902 | 7/1999 |

* cited by examiner

Primary Examiner—Binh Q. Tran
(74) Attorney, Agent, or Firm—Kenyon & Kenyon

(57) ABSTRACT

A method for checking the functionality of a water adsorber in the exhaust of an internal combustion engine is provided. A sensor measures the temperature of the exhaust gases downstream in the flow direction from the water adsorber, and the functionality of the water adsorber is judged based on the change over time in the rate of increase in the sensed temperature after the internal combustion engine has been started.

11 Claims, 5 Drawing Sheets

DIAGNOSIS OF A WATER ADSORBER IN THE EXHAUST OF AN INTERNAL COMBUSTION ENGINE

FIELD OF THE INVENTION

The invention relates to the diagnosis of a water adsorber (water trap) in the exhaust of an internal combustion engine in motor vehicles.

BACKGROUND INFORMATION

Exhaust systems having water traps in a variety of embodiments, and the materials required therefor, are described in Published International Patent Document No. WO 96/39576. After an internal combustion engine has been started, the onset of pollutant conversion in a three-way catalytic converter in the exhaust of the internal combustion engine in motor vehicles is particularly important in terms of compliance with increasingly stringent exhaust gas limit values. The onset of pollutant conversion depends on the activation temperature of the catalytic material and on the speed with which that activation temperature is reached after a cold start. Published International Patent Document No. WO 99/34902 describes that the activation temperature of the three-way catalytic converter can be considerably lowered if the support of the catalytically active material can be kept substantially dry. Moisture in the form of small water droplets occurs preferentially in the exhaust gas after a cold start of the internal combustion engine. As soon as the engine and the exhaust system are sufficiently warm, no further droplet formation occurs. In order to keep the catalytic converter dry after a cold start, a water trap (water adsorber) can be positioned upstream from the catalytic converter. A water trap collects water and water vapor below a certain temperature. Attainment of the activation temperature of the three-way catalytic converter can be additionally accelerated by so-called chemical heating. This utilizes the fact that if no water vapor is present, the CO exhaust component oxidizes at room temperature to $CO_2$ and releases a large quantity of heat. The catalytic converter 28 can be equipped with a coating that promotes the exothermic reaction of CO to $CO_2$. At low temperatures (e.g. at room temperature) the exothermic reaction process is extremely sensitive to water vapor. In other words, in the presence of water vapor the reaction occurs in only attenuated fashion or not at all. With regard to this chemical heating process as well, it is advantageous to remove water vapor from the exhaust gas with a water adsorber and to store it temporarily in the water adsorber. As the temperature of the exhaust gas and the exhaust system rises, the water stored in the water adsorber is then desorbed, and the water adsorber once again becomes receptive. The desorbing water does not interfere with pollutant conversion when the exhaust system is hot. Pollutant conversion after a cold start thus depends substantially on the functionality of the water adsorber. Any disruption in functionality should therefore be detected and remedied as quickly as possible.

SUMMARY

It is the object of the present invention to describe a method and an apparatus for diagnosing a water adsorber.

The method presented here for checking the functionality of a water adsorber in the exhaust of an internal combustion engine uses an arrangement for sensing the temperature in the flow direction of the exhaust gases downstream from the water adsorber, and is characterized in that the functionality of the water adsorber is judged based on the change over time in the rise in the aforesaid temperature after the internal combustion engine has been started.

This method allows diagnosis of a water adsorber using a temperature sensor that often is already part of an internal combustion engine control system. In the method according to the present invention, no direct investigation is made therewith as to the amount of water remaining in the water adsorber; the adsorption capability of interest is instead detected indirectly from the temperature curve. When the water adsorber is functional, the temperature should rise monotonically until it reaches the steady-state value of the instantaneous operating point. If the water adsorber cannot absorb water, the result is formation of an actual temperature plateau at the dewpoint temperature of the water, and this is used as the diagnostic criterion. Because of the indirect measurement using a temperature sensor that is often present, the method according to the present invention is economical. It has been demonstrated that evaluation according to the present invention of the temperature curve permits reliable diagnosis of the water adsorber. An embodiment is characterized in that the slope of the temperature curve is calculated at various points in time, and if a decreasing slope is followed by an increasing slope, a conclusion is drawn that the water adsorber's functionality is insufficient. This method permits easy and reliable determination of a halt point or temperature plateau, at which any further heat input is first utilized for the vaporization of water before further heating of the catalytic converter occurs. A further embodiment is characterized in that the water adsorber is judged to be incompletely functional if a decreasing slope occurs in a predetermined temperature range. This method too permits a reliable determination of a holding point. A development of this embodiment provides that the predetermined temperature range contains the value 70° C. This development demonstrates that despite a dependency on the pressure in the catalytic converter and thus on the flow velocity of the exhaust gas, the temperature of the plateau is always approximately 70° C. A further exemplary embodiment provides that the predetermined range extends symmetrically around the value 70° C. A further embodiment provides that the water adsorber is determined to be incompletely functional if the time period during which the temperature remains in the predetermined range exceeds a predetermined threshold value. The advantage of this embodiment is that it requires no or very few calculations. A further exemplary embodiment provides that the water adsorber is determined to be incompletely functional if the average slope of the temperature curve is, up to a predetermined point in time, less than a predetermined threshold value. This method as well is characterized in that only a few calculations are necessary. A further embodiment is characterized in that a first value for the aforesaid temperature is calculated from operating variables of the internal combustion engine using the assumption of a functional (nonfunctional) water adsorber; and that a second value for the aforesaid temperature is measured; and that the water adsorber is judged to be incompletely functional if the difference between the measured temperature and the temperature calculated from the operating variables of the internal combustion engine exceeds (falls below) a predetermined value. This method is suitable especially if the internal combustion engine is being operated with a control unit in which an exhaust gas temperature model is calculated. Modeling of the exhaust gas temperature and/or of the catalytic converter temperature is described, for example, in German Published Patent Document No. 43 38 342 (which corresponds to U.S. Pat. No. 5,590,521). The present invention is also directed toward a control device for performing the aforementioned methods.

DETAILED DESCRIPTION

Figure 1:
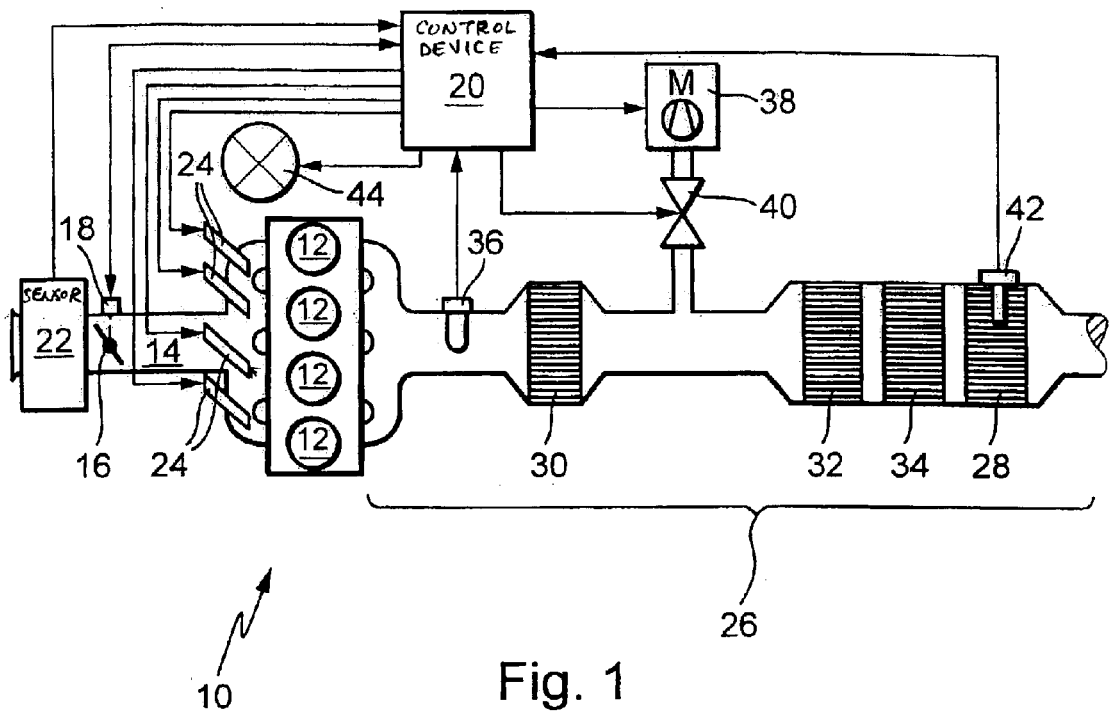
FIG. 1 illustrates an internal combustion engine system with a catalytic converter and a water adsorber.

Referring to FIG. 1, element 10 designates an internal combustion engine having combustion chambers 12 in which a mixture of fuel and air is combusted. In FIG. 1, the fuel/air mixture is formed in an intake manifold 14. The quantity of air drawn in by the internal combustion engine is adjusted by a control device 20 via a throttle valve 16 having a throttle valve actuator 18, and is sensed by an air quantity sensor 22. Control device 20 activates injection valves 24 with injection pulse widths, in order to meter the fuel concentration in the fuel/air mixture appropriately for the quantity of air drawn in. Instead of the external mixture formation in the intake manifold illustrated here, it is also possible for internal mixture formation to occur in combustion chambers 12 of internal combustion engine 10, as is the case in internal combustion engines with direct fuel injection.

After combustion of the fuel/air mixture in combustion chambers 12, the resulting exhaust gas is passed through an exhaust system 26 having a three-way catalytic converter 28. Three-way catalytic converter 28 may be preceded by a primary converter 30, a water adsorber 32, and a hydrocarbon adsorber 34. Primary converter 30 that is optionally present is characterized by an installation location close to the engine, and by a small size. The low heat capacity of primary converter 30 resulting from the small size, together with a location close to the engine, ensures that primary converter 30 heats up very quickly after a cold start of internal combustion engine 10. Because of the small size, however, primary converter 30 is not capable of converting the exhaust gas of the larger quantities of fuel/air that occur in the context of higher engine speeds and larger combustion chamber charges. For this reason, rapid activation of three-way catalytic converter 28 is also very important in terms of exhaust quality.

An exhaust probe 36 that may be positioned upstream from primary converter 30 supplies control device 20 with a signal regarding an oxygen content of the exhaust gas. With this information, control device 20 may check to a certain extent whether the metered fuel quantity has resulted in the desired fuel/air ratio, and may correct the fuel quantity for the next injections in a closed control loop. A secondary air pump 38 blows fresh air through a secondary air valve 40 into exhaust system 26 downstream from primary converter 30. A temperature sensor 42 is positioned downstream from water adsorber 32, and supplies control device 20 with a signal concerning the exhaust gas temperature and/or catalytic converter temperature.

The system illustrated is suitable for chemical heating of the catalytic converter by room-temperature oxidation of the CO exhaust component to $CO_2$ in three-way catalytic converter 28. The large quantity of thermal energy released during this oxidation heats up three-way catalytic converter 28. In this system, the oxidation of CO to $CO_2$ and of $H_2$ to $H_2O$ at ambient temperature is achieved in that CO is produced in the exhaust gas by operating the internal combustion engine with a fuel-rich mixture, and the oxygen necessary for oxidation of the CO is blown into exhaust system 26 using secondary air pump 38. NOx constituents in the exhaust gas, which might interfere with the oxidation of CO to $CO_2$, are eliminated by using the primary converter in conjunction with operation of the internal combustion engine with a fuel-rich mixture. HC constituents in the exhaust gas, which also might interfere with the oxidation reaction, are eliminated by the use of hydrocarbon adsorber 34. Water constituents in the exhaust gas are eliminated by way of water adsorber 32.

In this method, it is important that water adsorber 32 be completely emptied of water before internal combustion engine 10 is started. This may be ensured, for example, by operating internal combustion engine 10 with hot exhaust gas for a sufficiently long period. If residual water is still present in water adsorber 32, the water cannot be entirely removed from the exhaust gas at the next cold start of internal combustion engine 10, thus causing water to be present in three-way catalytic converter 28. As a result, the exothermic reaction of CO to $CO_2$ cannot take place immediately, and rapid activation of three-way catalytic converter 28 fails to occur. With the present invention, it is possible to determine accurately the reason why an exothermic reaction of CO to $CO_2$ fails to occur. If water penetrates into three-way catalytic converter 28, or into the region of the coating that promotes the oxidation of CO to $CO_2$, a temperature profile characteristic of catalytic converter heating in the presence of water will occur therein. This may be indicated, for example, by activation of a fault indicator light 44. The fact that the temperature remains at approximately 70° C. for a certain time is characteristic of the presence of water vapor. A temperature plateau occurs, since the thermal energy being released is first utilized to vaporize the water and only then contributes to further heating of the catalytic converter. The temperature of the plateau is defined by the dewpoint of the water. The exact temperature of this plateau depends on the prevailing pressure in the catalytic converter, i.e., on the flow velocity of the exhaust gas and thus on the mass air flow through the internal combustion engine. It always occurs, however, at approximately 70° C.

Figure 2:
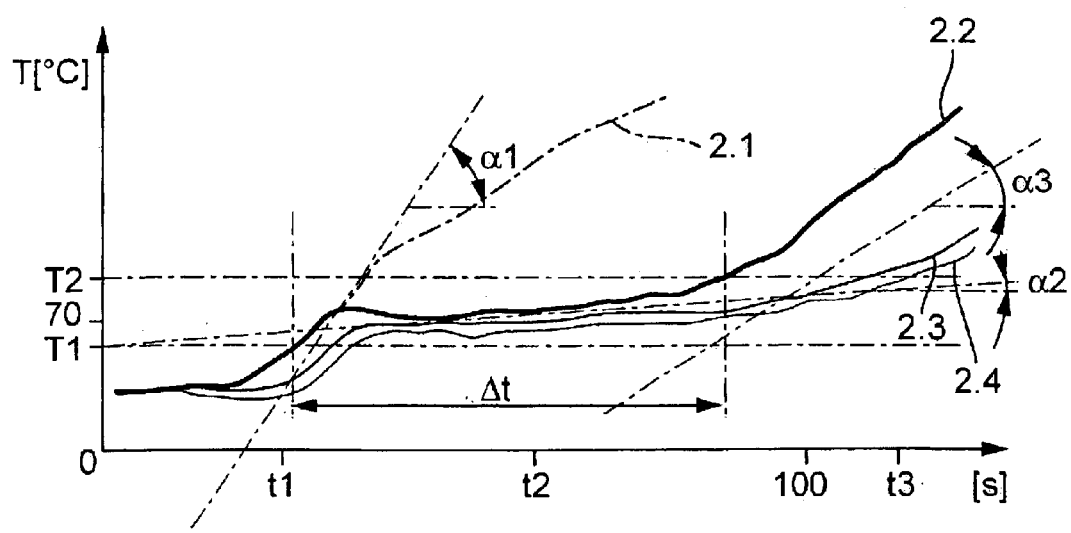
FIG. 2 shows several temperature curves over time, to illustrate the method according to the present invention.

Curves 2.2, 2.3, and 2.4 in FIG. 2 represent typical profiles for temperature T over time t that occur in the presence of water by a temperature sensor 42 downstream from water adsorber 32. The initially steep rise in temperature in the vicinity of time t1 is clearly visible; this then transitions, within time period $\Delta\_t$, into a very flat slope and then once again increases with a steeper slope. The flat profile of curves 2.2, 2.3, and 2.4 in time period $\Delta\_t$ represents the time during which the heat released in catalytic converter 28 is being expended on the vaporization of water. In contrast thereto, curve 2.1 (drawn with a dot-dash line) represents a rapid temperature rise that may be observed without the occurrence of water. In this instance, the rapid temperature rise at t1 continues without formation of a temperature plateau, ultimately resulting in a substantially faster increase in the temperature of catalytic converter 28.

Figure 3:
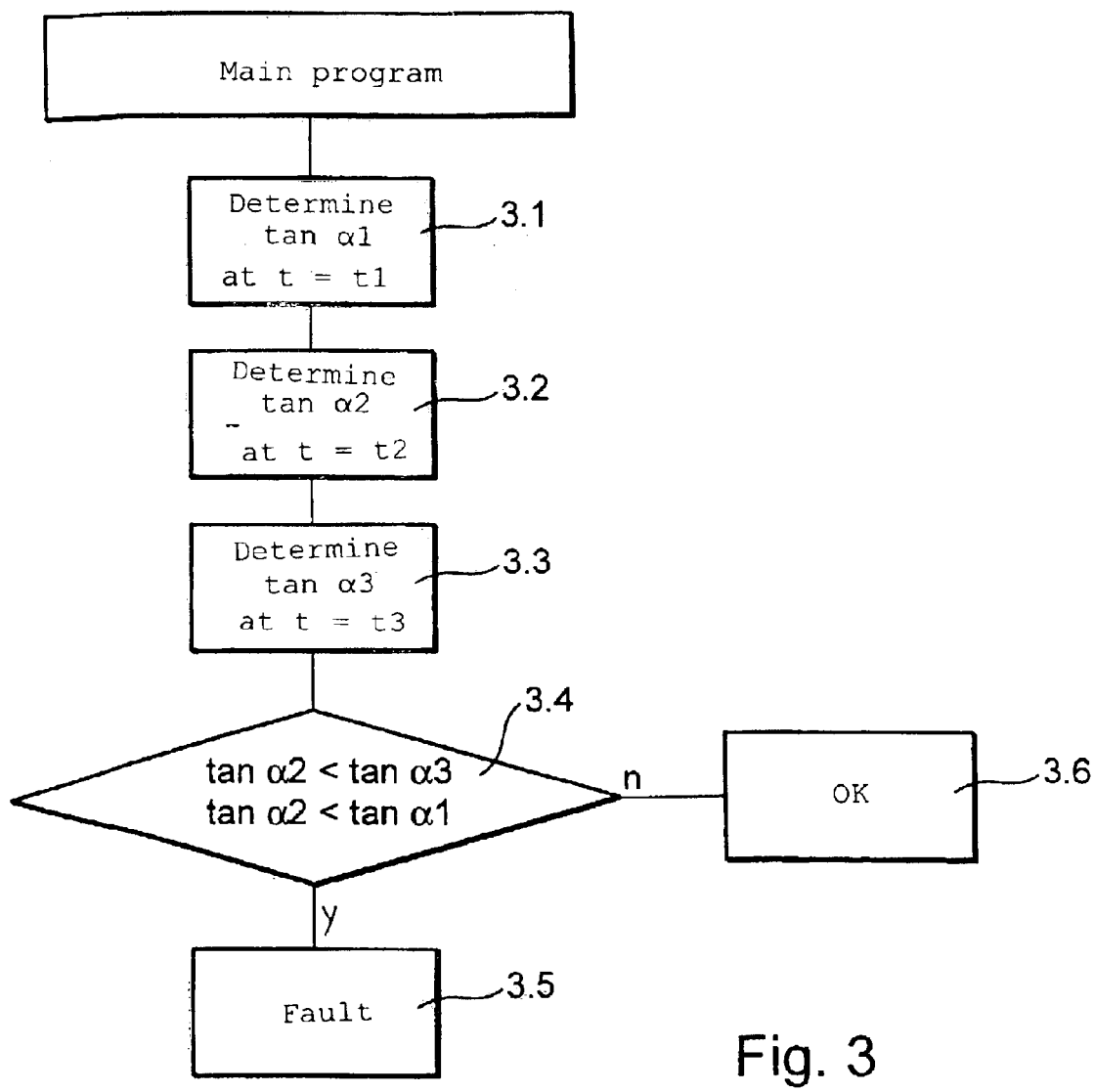
FIGS. 3 through 6 show flow charts for exemplary embodiments of the method according to the present invention.

FIG. 3 illustrates a first flow chart as an exemplified embodiment of the method according to the present invention. From a higher-level main program for engine control, after a cold start of internal combustion engine 10 a step 3.1 is reached in which the slope tan α1 in the region of time t1, i.e., in the region of the initially steep temperature curve, is determined. Tan α thus represents a slope of the temperature curve downstream from water adsorber 32 before the dewpoint is reached. This is followed, in steps 3.2 and 3.3 respectively, by determination of further slopes tan α2 and tan α3 at times t2 and t3. Three slopes are thus measured during the temperature rise after a cold start. In a step 3.4, the program checks whether the slope at time t2 is less than the slope at time t3 (tan α2<tan α3), and whether the slope at time t2 is less than the slope at time t1 (tan α2<tan α1). If the answer to this query is Yes, this means that the temperature profile has first exhibited a comparatively steep slope tan α1, then a comparatively shallow slope tan α2, and then once again a comparatively steep slope tan α3. As is evident from FIG. 2, this kind of profile is typical of the formation of a plateau in the temperature curve. A fault message is accordingly outputted in a step 3.5, indicating that the failure of the exothermic reaction is attributable to water in the exhaust gas and therefore to an incompletely functional water trap (water adsorber). This fault message may be stored in a memory of control device 20 and later read out, for example during a service visit; or it can be used to activate a fault indicator lamp 44.

Figure 4:
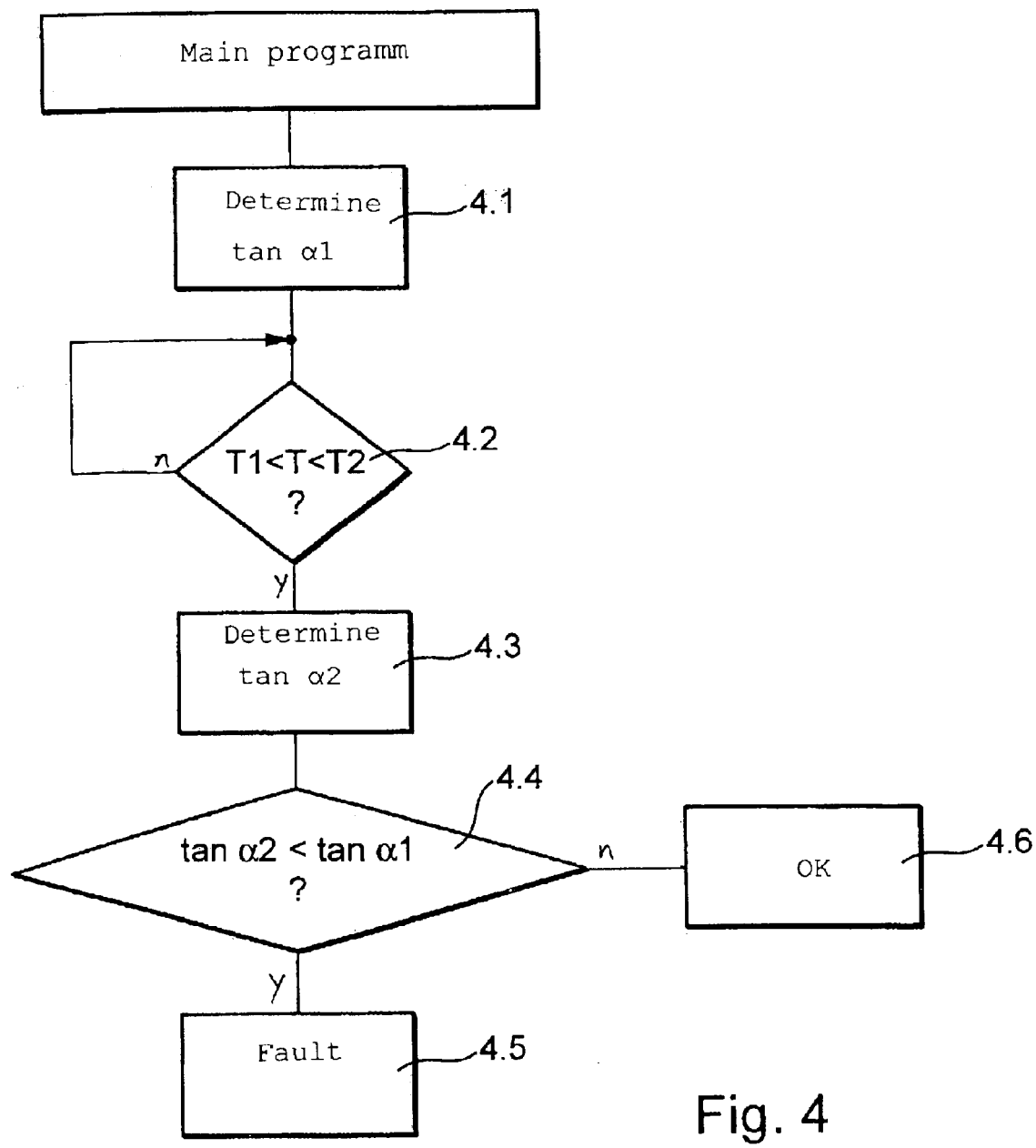

FIG. 4 illustrates a further exemplified embodiment of the method according to the present invention. Here, from a main program for engine control, after a cold start a step 4.1 is reached in which the initial slope tan α1 of the temperature curve in the vicinity of a time t1 is calculated. The program then checks whether the temperature sensed by temperature sensor 42 lies within a temperature interval (T1, T2) that contains the dewpoint of the water. If the temperature lies in that interval, the slope tan α2 of the temperature curve is determined in a step 4.3. A step 4.4 checks whether the slope tan α2 is less than the slope tan α1. If that is the case, then in step 4.5 a fault message analogous to the fault message in step 3.5 in FIG. 3 is issued. This exemplified embodiment is based on the consideration that the aforementioned interval (T1, T2) that contains the dewpoint of the water is precisely the temperature range in which, in the presence of water, a temperature plateau with a shallow temperature curve slope may be expected. If this is confirmed in step 4.4, a corresponding fault message is outputted, while otherwise, in step 4.6, a signal can be stored indicating that the water trap (water adsorber) is functional.

Figure 5:
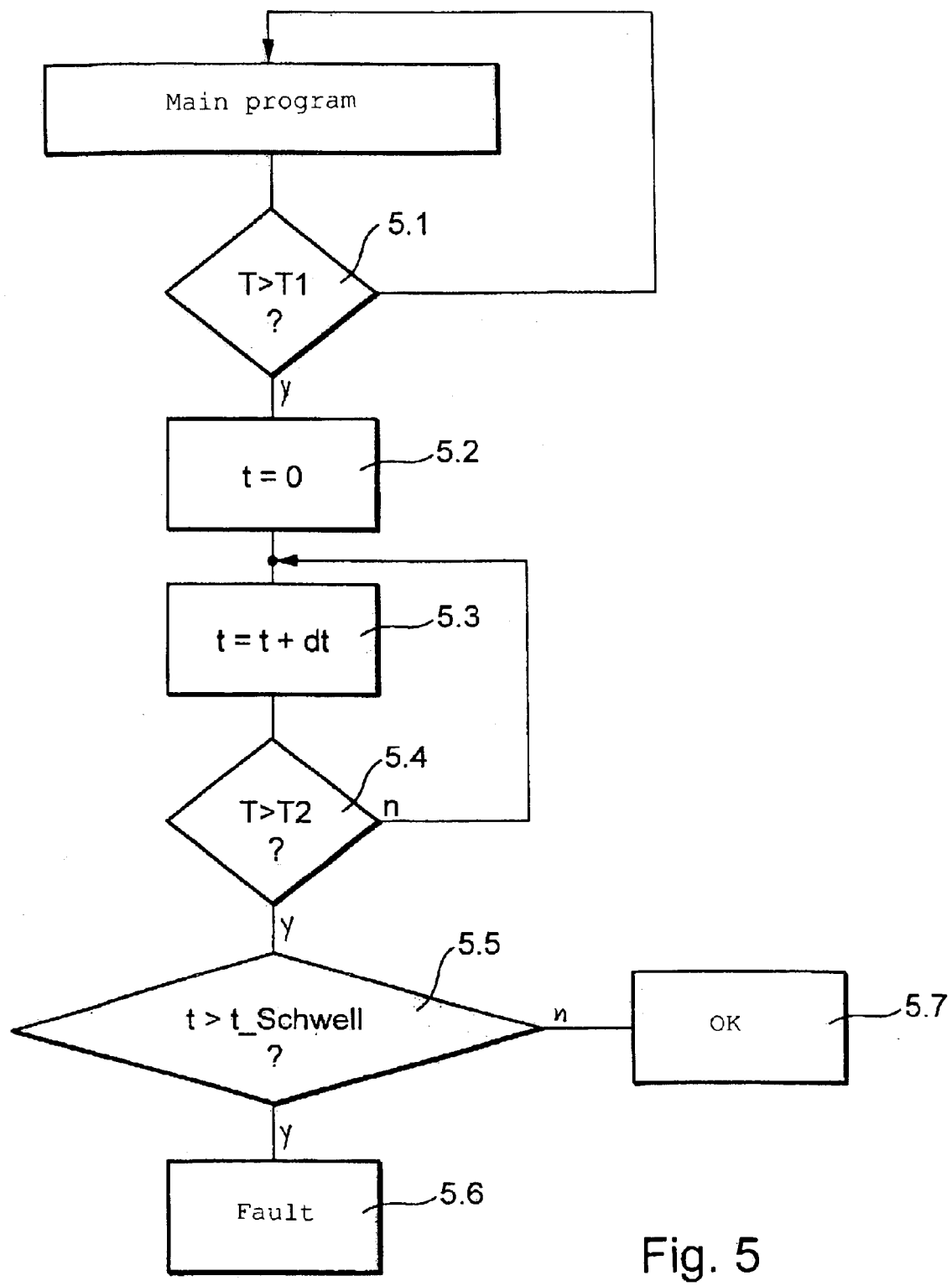

FIG. 5 illustrates a further exemplary embodiment of the invention. Here, after a cold start, a step 5.1 first checks whether the temperature T sensed by temperature sensor 42 is greater than the lower limit of the interval (T1, T2). As soon as the temperature T enters this range from below, the query in 5.1 is answered Yes, and in step 5.2 a time variable t is set to a value of zero. In step 5.3 the time variable t is then incremented by a value dt. Step 5.4 queries whether temperature T has risen sufficiently to exit from the interval (T1, T2). As long as this is not the case, the loop made up of steps 5.4 and 5.3 is repeated, and the counter t is incremented by dt each time. As soon as T becomes greater than T2, the program proceeds to step 5.5, which checks whether the value of the time variable t exceeds a threshold value t_schwell. If so, then in step 5.6 a fault message analogous to the fault messages of steps 4.5 in FIG. 4 and 3.5 in FIG. 3 is issued. Otherwise an "OK" message occurs in step 5.7. This exemplified embodiment is based on the consideration that a temperature which remains for too long a time in the temperature range (T1, T2) also indicates a temperature plateau. This is also immediately evident from FIG. 2, since without a plateau the time Δ_t in FIG. 2, which in the case of curve 2.2 of FIG. 2 corresponds to the time variable t of FIG. 5, is very short.

Figure 6:
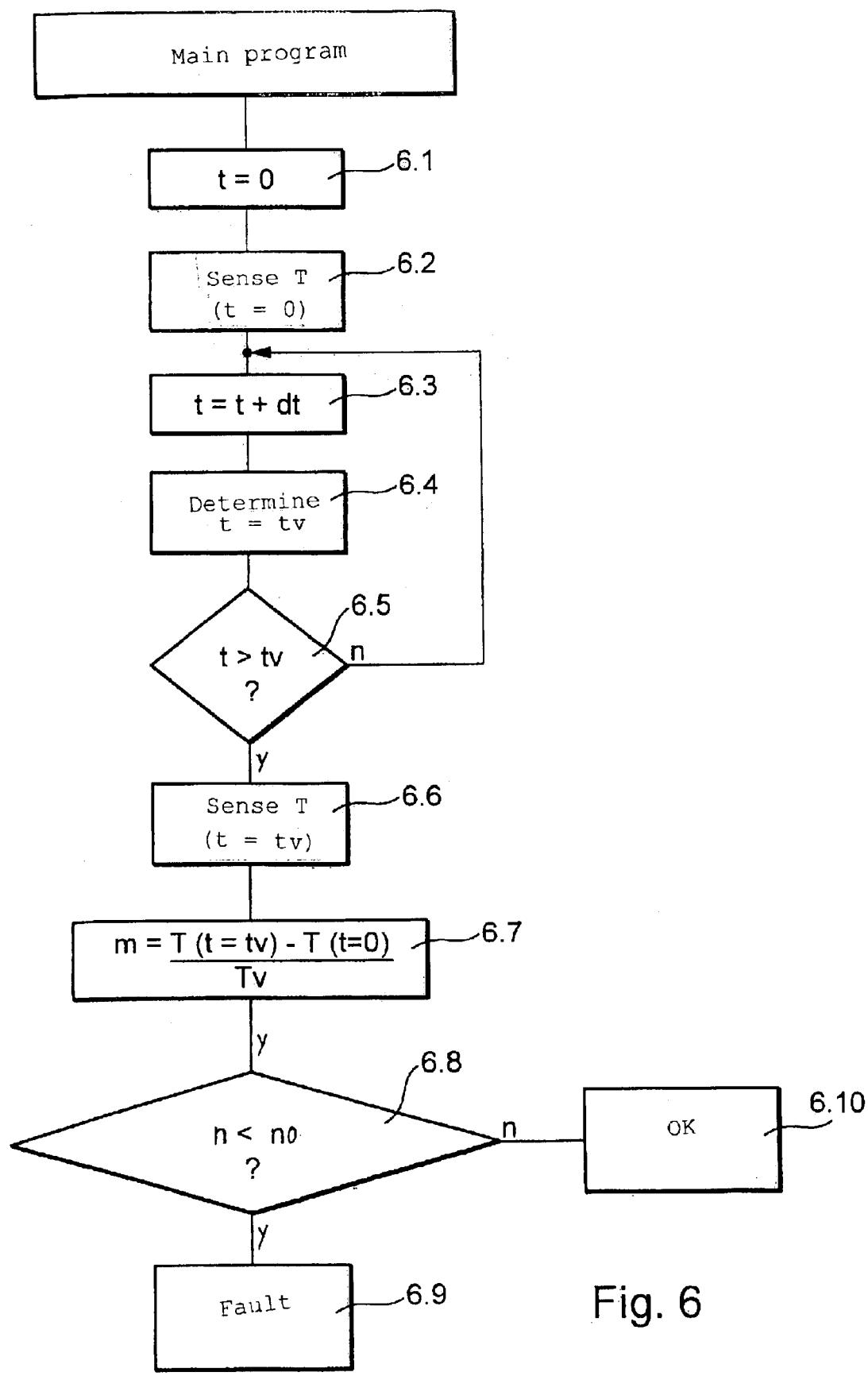

FIG. 6 illustrates a further exemplary embodiment. In step 6.1, after a cold start of the engine, a time variable t is set to a value of zero. The temperature T sensed by temperature sensor 42 is then sensed at a time t=0. In a step 6.3, t is then incremented by a value dt. In step 6.4, a delay time tv is determined. Step 6.5 serves to compare time t to the value of the delay time tv. As long as t is less than tv, the query in step 6.5 is answered NO, and the loop made up of steps 6.5 and 6.3 is cycled through repeatedly, thereby increasing the value of variable t by the increment value dt at each pass. When the delay time tv elapses, t exceeds the value of tv in step 6.5, and execution branches into step 6.6, where the temperature T at the time t=tv is sensed. This is followed, in step 6.7, by a calculation of the slope of the temperature between the times t=0 and t=tv, by calculating the value difference T(t=tv)−T(t=0) and dividing that difference by the value of the delay time tv. If the slope thus calculated is less (in step 6.8) than a threshold value n0, then in step 6.9 a fault signal is generated, by analogy with the generation of fault signals in steps 5.6 of FIG. 5, 4.5 of FIG. 4, and 3.5 of FIG. 3. Otherwise an "OK" signal is issued in step 6.10. This exemplary embodiment is based on the consideration that a shallow overall slope n is also produced by a temperature plateau.

What is claimed is:

1. A method for determining a functionality of a water adsorber in an exhaust system of an internal combustion engine, comprising:

sensing a temperature of exhaust gases downstream in a flow direction from the water adsorber; and judging the functionality of the water adsorber based on a change over time in a rate of increase in the sensed temperature after the internal combustion engine has been started.

2. A method for determining a functionality of a water adsorber in an exhaust system of an internal combustion engine, comprising:

sensing a temperature of exhaust gases downstream in a flow direction from the water adsorber; and judging the functionality of the water adsorber based on a change over time in a rate of increase in the sensed temperature after the internal combustion engine has been started;

wherein a slope of a temperature curve of the exhaust gases downstream from the water adsorber is calculated at various points in time, and wherein the water adsorber functionality is determined to be insufficient if the temperature curve shows a decreasing slope followed by an increasing slope.

3. A method for determining a functionality of a water adsorber in an exhaust system of an internal combustion engine, comprising:

sensing a temperature of exhaust gases downstream in a flow direction from the water adsorber; and judging the functionality of the water adsorber based on a change over time in a rate of increase in the sensed temperature after the internal combustion engine has been started;

wherein the water adsorber is determined to be incompletely functional if a decreasing slope for the rate of increase of the sensed temperature occurs in a predetermined temperature range.

4. The method according to claim 3, wherein the predetermined temperature range includes 70° C.

5. The method according to claim 4, wherein the predetermined temperature range has a width of 20° C. to 50° C.

6. The method according to claim 4, wherein the predetermined range extends symmetrically around 70° C.

7. A method for determining a functionality of a water adsorber in an exhaust system of an internal combustion engine, comprising:

sensing a temperature of exhaust gases downstream in a flow direction from the water adsorber; and judging the functionality of the water adsorber based on a change over time in a rate of increase in the sensed temperature after the internal combustion engine has been started;

wherein the water adsorber is determined to be incompletely functional if a time period during which the sensed temperature remains within a predetermined range exceeds a predetermined threshold value.

8. A method for determining a functionality of a water adsorber in an exhaust system of an internal combustion engine, comprising:

sensing a temperature of exhaust gases downstream in a flow direction from the water adsorber; and judging the functionality of the water adsorber based on a change over time in a rate of increase in the sensed temperature after the internal combustion engine has been started;

wherein the water adsorber is determined to be incompletely functional if an average slope of a temperature curve of the sensed temperature is, up to a predetermined point in time, less than a predetermined threshold value.

9. A method for determining a functionality of a water adsorber in an exhaust system of an internal combustion engine, comprising:

sensing a temperature of exhaust gases downstream in a flow direction from the water adsorber;

judging the functionality of the water adsorber based on a change over time in a rate of increase in the sensed temperature after the internal combustion engine has been started; and calculating a first value for the temperature of the exhaust gas downstream from the water adsorber based on operating variables of the internal combustion engine using an assumption of a functional water adsorber;

wherein a second value for the temperature of the exhaust gas downstream from the water adsorber is sensed, and wherein the water adsorber is judged to be incompletely functional if a difference between the sensed temperature and the temperature calculated from the operating variables of the internal combustion engine exceeds a predetermined value.

10. A method for determining a functionality of a water adsorber in an exhaust system of an internal combustion engine, comprising:

sensing a temperature of exhaust gases downstream in a flow direction from the water adsorber;

judging the functionality of the water adsorber based on a change over time in a rate of increase in the sensed temperature after the internal combustion engine has been started; and calculating a first value for the temperature of the exhaust gas downstream from the water adsorber based on operating variables of the internal combustion engine using an assumption of a non-functional water adsorber;

wherein a second value for the temperature of the exhaust gas downstream from the water adsorber is sensed, and wherein the water adsorber is judged to be incompletely functional if a difference between the measured temperature and the temperature calculated from the operating variables of the internal combustion engine falls below a predetermined value.

11. A system for determining a functionality of a water adsorber in an exhaust system of an internal combustion engine, comprising:

a sensor for sensing a temperature of exhaust gases downstream in a flow direction from the water adsorber; and an arrangement for determining the functionality of the water adsorber based on a change over time in a rate of increase in the sensed temperature after the internal combustion engine has been started.

* * * * *